United States Patent [19]

Drayer

[11] Patent Number: 4,679,410
[45] Date of Patent: Jul. 14, 1987

[54] INTEGRAL EVAPORATOR AND ACCUMULATOR FOR AIR CONDITIONING SYSTEM

[75] Inventor: William Drayer, Romeo, Mich.

[73] Assignee: General Motors Corporation, Detroit, Mich.

[21] Appl. No.: 924,798

[22] Filed: Oct. 30, 1986

[51] Int. Cl.⁴ .................... F25B 43/00; F25B 39/02
[52] U.S. Cl. ................................. 62/503; 62/524; 165/153
[58] Field of Search ............... 62/219, 503, 515, 524, 62/526; 165/153

[56] References Cited

U.S. PATENT DOCUMENTS

| | | | |
|---|---|---|---|
| 2,801,523 | 8/1957 | Hansen | 62/503 X |
| 2,878,656 | 3/1959 | Domal | 62/524 X |
| 3,146,603 | 9/1964 | Porter, Jr. | 62/219 X |
| 3,635,040 | 1/1972 | Morris, Jr. | 62/219 |
| 4,470,455 | 9/1984 | Sacca | 165/167 |
| 4,589,265 | 5/1986 | Nozawa | 62/526 |
| 4,614,231 | 9/1986 | Proctor et al. | 165/153 |

Primary Examiner—William E. Tapolcai
Attorney, Agent, or Firm—R. L. Phillips

[57] ABSTRACT

An integral evaporator and accumulator for a motor vehicle air conditioning system formed with a stack of generally similarly configured plates and a pair of tanks.

2 Claims, 4 Drawing Figures

4,679,410

INTEGRAL EVAPORATOR AND ACCUMULATOR FOR AIR CONDITIONING SYSTEM

TECHNICAL FIELD

This invention relates to evaporators and accumulators for air conditioning systems and more particularly to an integral evaporator and accumulator for a motor vehicle air conditioning system.

BACKGROUND OF THE INVENTION

It is common practice in motor vehicle air conditioning systems to have a plate and fin type evaporator and a canister type accumulator as a separate component connected between the evaporator and the suction side of the compressor. In the quest to reduce the space required for the vehicle accessories, some such components have been downsized significantly but it appears that further gains are not readily forthcoming particularly in the direction of attempting to downsize further by integrating the evaporator and accumulator as one component because of the vast traditional differences in their construction.

SUMMARY OF THE INVENTION

The present invention provides a practical cost efficient solution to downsizing evaporators and accumulators for a motor vehicle air conditioning system and the like by integrally forming them as a single component using a stacked plate type construction normally used only for the evaporator. The multipurpose component which will also be referred to as an "evapo-lator" is comprised of a plurality of elongated plates that are stacked one on another and are configured with cavities intermediate their ends after the manner of a conventional plate and fin evaporator so as to define a pair of longitudinally spaced manifolds that are interconnected by a plurality of tube passes and with one of the manifolds partitioned to effect a back and forth or twin pass flow path. But now in addition, the plates are also formed with additional cavities so as to define an accumulator chamber outboard of each of the evaporator manifolds. Moreover, a tank is sealingly joined to the periphery of each of the outermost plates with one tank serving as a bottom tank and being open to the bottom of both the accumulator chambers and having an inlet pipe extending therethrough to the lowermost section of the partitioned evaporator manifold. The other tank serves as a top tank and communicates the other section of the partitioned evaporator manifold which is the outlet of the evaporator with the top of both the accumulator chambers. An outlet pipe extends through the top tank at a place diagonally opposite the inlet pipe and an aspirator tube for liquid oil and refrigerant is mounted with its outlet end in the outlet pipe and extends downward through the accumulator chamber on this side so that its inlet end is located near the bottom thereof.

Thus the canister parts and baffling normally associated with the conventional accumulator are eliminated and are instead integrally formed with the evaporator by special added formations in the end regions of the evaporator plates after the manner of the normal evaporator manifolds which are now located intermediate thereof and internally joined therewith. This results in a substantial reduction in the accumulator space envelope and also in the cost of material and labor for the accumulator. Furthermore, there is also eliminated the normal piping and fittings to connect the evaporator and accumulator.

DESCRIPTION OF PREFERRED EMBODIMENT

These and other objects, advantages and features of the invention will become more apparent from the following description and drawings wherein.

Figure 1:
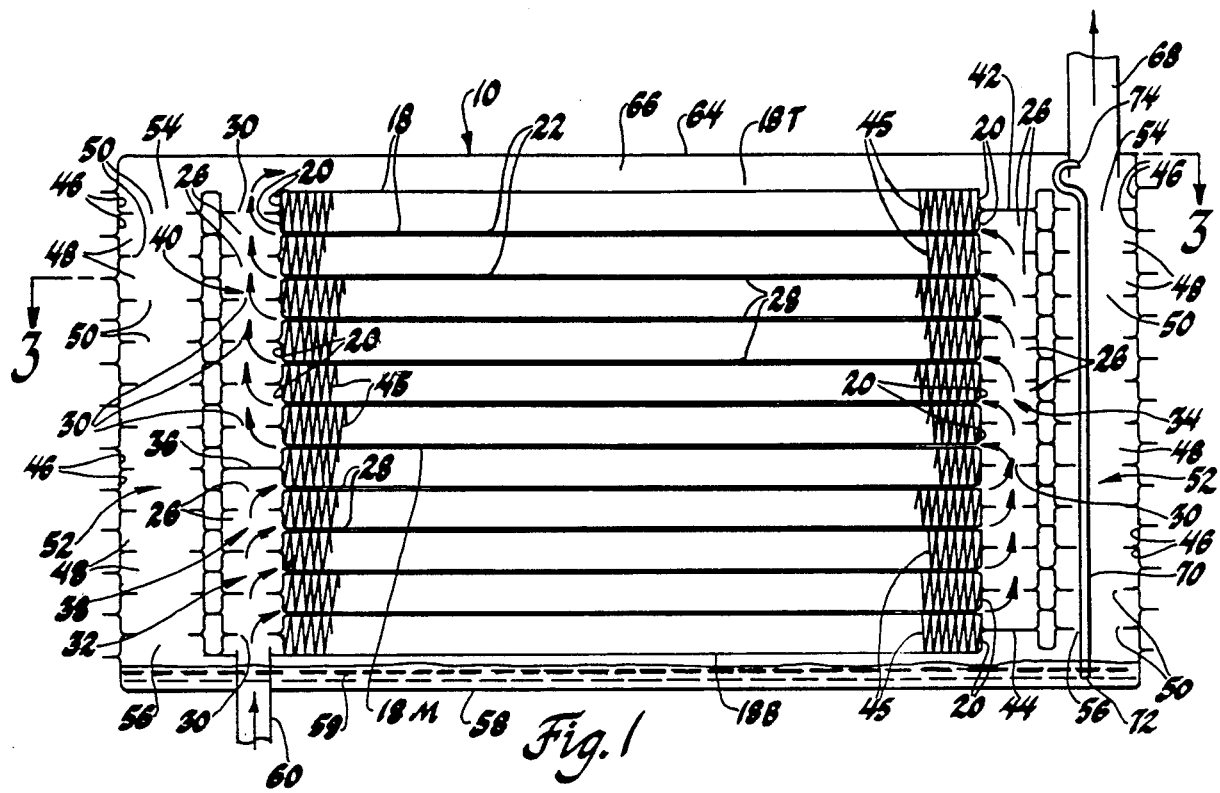
FIG. 1 is a diagramatic sectional view of the preferred embodiment of the integral evaporator and accumulator (evapo-lator) according to the invention.
Figure 4:
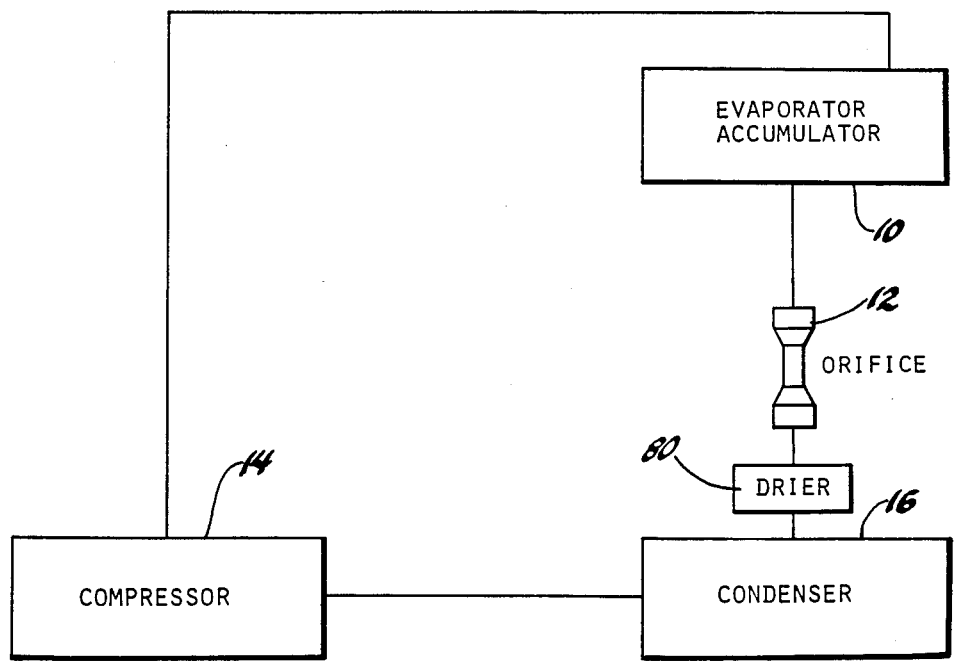
FIG. 4 is schematic view of the evapo-lator in FIG. 1 installed in a motor vehicle air conditioning system.

Referring to the drawings wherein the same numbers are used throughout the several views to identify the same or similar parts, there is shown in FIG. 1 an integral evaporator and accumulator 10, also termed here an evapo-lator, adapted for use in a motor vehicle air conditioning system as shown in FIG. 4. In such system, the evapo-lator 10 is connected between an orifice 12 and the suction side of an engine driven refrigerant compressor 14 whose discharge side is connected to a condenser 16 that is upstream of the orifice. The system components apart from the evapo-lator are conventional and operate in the normal manner well known in this art.

The evapo-lator 10 comprises a plurality of plates 18 stamped from thin (e.g. 0.030 inch) aluminum sheet. The plates have an elongated shape and are stacked one on another to form an overall rectangular box shape. The plates are formed on their interior side with longitudinally spaced evaporator manifold defining cavities 20 interconnected by an elongated evaporator tube pass defining cavity or channel 22 having staggered flow directing ribs 24 (see FIG. 3) like that in U.S. Pat. No. 4,470,455 which is hereby incorporated by reference. The plates are arranged so that their cavities cooperate with the corresponding ones in an adjoining and oppositely facing plate so as to define a pair of longitudinally spaced evaporator manifold chambers 26 interconnected by a single staggered rib tube pass 28 between each such pair of oppositely facing plates with such chambers adjoining each other adjacent the remote ends of the plates. Those plates except for the top plate 18T and bottom plate 18B and the midposition plate 18M have an opening 30 through both their manifold cavities that connect the adjoining evaporator chambers at each end so as to define a vertically oriented evaporator manifold 32 and 34 at the left and right hand end of the plate stack respectively.

The midposition or intermediate plate 18M has as shown in FIG. 1 only one such opening 30 at its right hand end connecting the adjoining chambers and provides a blockage 36 at its other end whereby the evaporator manifold at the latter end is partitioned into two sections 38 and 40. This forms a flow path as indicated by the arrows from the lower evaporator manifold section 38 through the connected lower half of the tube passes 28 to the other evaporator manifold 34 and back through the connected remaining upper half of the tube passes to the upper evaporator manifold section 40. The top plate 18T also has but one opening 30 and this is to the top of the upper evaporator manifold section 40 while the opposite end of this plate forms a blockage 42 to close the top of the other manifold 34. Similarly, the bottom plate 18B has but one opening 30 and this is to the bottom of the lower evaporator manifold section 38 while the opposite end of this plate forms a blockage 44 to close the bottom of the other manifold 34. In addition, there is disposed a corrugated aluminum fin 45 in the air flow space between the oppositely facing exterior sides of the plates as is conventional practice.

Figure 2:
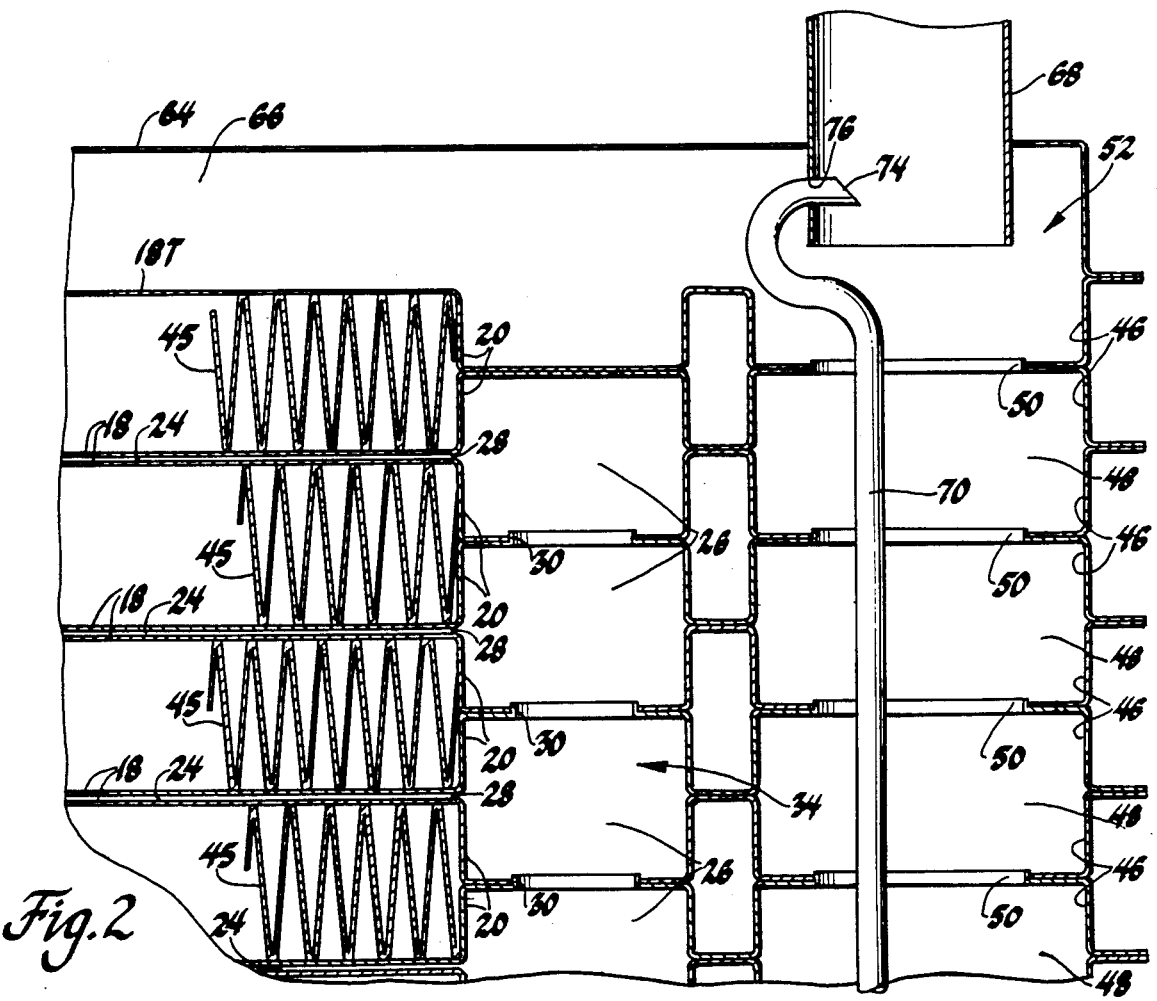
FIG. 2 is an enlarged view of a portion of the evapo-lator in FIG. 1.
Figure 3:
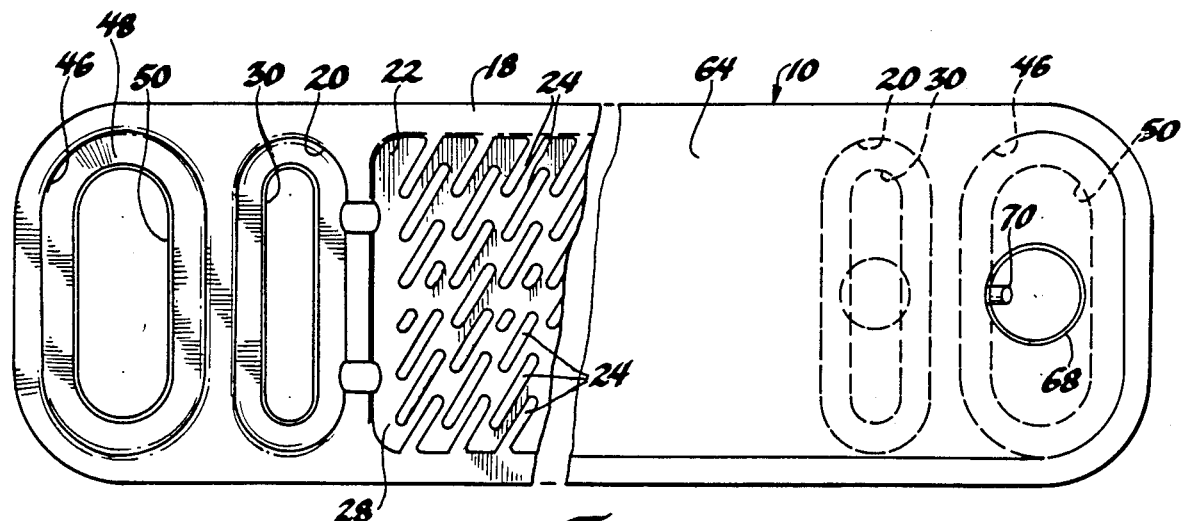
FIG. 3 is a view taken along the line 3—3 in FIG. 1.

The plates further have accumulator defining cavities 46 in their interior face that are located outboard of the evaporator defining cavities and cooperate with the corresponding ones in the adjoining and oppositely facing plate so as to define a plurality of adjoining accumulator chambers 48 at the remote ends of the stacked plates (see FIGS. 1–3). The plates all have an opening 50 at both ends thereof that connect the adjoining accumulator chambers so as to form a vertically oriented side accumulator chamber 52 with an open top 54 and open bottom 56 at each remote end of the stacked plates.

As shown in FIG. 1, a bottom tank 58 cooperates with the bottom plate 18B to form a bottom accumulator chamber 59 that is open to both the side accumulator chambers 52 at their bottom end. An aluminum inlet pipe 60 extends through the bottom of the bottom tank to the opening 30 to the lower evaporator manifold section 38. As shown in FIGS. 1–3, a top tank 64 cooperates with the top plate 18T to form a top accumulator chamber 66 open to the opening 30 to the upper evaporator manifold section 40 and also to both the side accumulator chambers 52 at their top end. An outlet pipe 68 located diagonally opposite the inlet pipe extends through the top of the top tank so as to be open to the interior thereof and align with the top end of the right hand side accumulator chamber. In addition, an aspirator or pickup tube 70 for picking up and atomizing liquid refrigerant and oil and returning same to circulation in the system is located in the right hand side accumulator chamber 52 with its inlet end 72 near the bottom of the bottom tank 58 and its outlet end 74 in the outlet tube. The pickup tube is formed with a hook shape at its upper end for mounting in a hole 76 in the outlet tube and its outlet end 74 is angled downstream to assist the suctioning action (see FIG. 2).

The plates, fins, tanks, inlet pipe, outlet pipe and suction tube are all brazed together at their respective junctures including the peripheries of the tanks and outermost plates to sealingly secure their above described arrangement together as an integral unit for refrigerant flow in the direction indicated by the arrows. Thus, many normally used parts such as a separate accumulator baffle, connector pipes, fittings and o-ring seals are eliminated by this single unit as compared with separate evaporator and accumulator units. Moreover, with the remote location of the combined outlet of the evaporator and inlet of the accumulator from the outlet of the latter and the added volume and baffling provided by the top tank and plate, a gaseous refrigerant state is assured at the accumulator outlet. On the other hand, where there is a need for removing any water that might enter the system, it is contemplated that an external filter drier 80 containing a desiccant would be added in the system between the orifice and condenser as shown in FIG. 4.

The above described embodiment is illustrative of the invention which may be modified within the scope of the appended claims.

The embodiments of the invention in which an exclusive property or privilege is claimed are defined as follows:

1. An integral accumulator and evaporator for an air conditioning system comprising a plurality of plates stacked one on another with one plate on top and another plate on the bottom of the stack, said plates having a pair of evaporator manifold defining cavities interconnected by an elongated evaporator tube pass defining cavity formed in one face thereof, said plates arranged so that their above said cavities cooperate with the corresponding ones in an adjoining and oppositely facing plate so as to define a pair of longitudinally spaced evaporator manifold chambers interconnected by a tube pass between each such pair of oppositely facing plates whereby there is formed a plurality of adjoining evaporator chambers adjacent remote ends of the stacked plates, those plates except for said top and bottom plates and at least one intermediately located plate having an opening connecting the adjoining evaporator chambers at each end so as to define a vertically oriented evaporator manifold with an upper end and a lower end adjacent each end of said stacked plates, said one intermediate plate having an opening connecting the chambers between the two adjoining pairs of said plates adjacent only one of said ends and blocking connection between the corresponding chambers adjacent the other end whereby the manifold adjacent said one end is partitioned into a lower manifold section and an upper manifold section so as to form a flow path from said lower manifold section through the associated tube passes to the other manifold and back through the remaining associated tube passes to said upper manifold section, said top plate having an opening therethrough to said upper manifold section and closing the upper end of the other evaporator manifold, said bottom plate having an opening therethrough to said lower manifold section and closing the other end of said other evaporator manifold, said plates also having accumulator defining cavities in their said face that cooperate with the corresponding ones in the adjoining and oppositely facing plate so as to define a plurality of adjoining accumulator chambers at the remote ends of the stacked plates, said plates having an opening therethrough connecting the adjoining accumulator chambers whereby there is formed a vertically oriented accumulator chamber with an open top and an open bottom, a bottom tank sealingly connected to said bottom plate so as to cooperate therewith to form a bottom accumulator chamber open to both said accumulator chambers at their bottom end, an inlet pipe extending through said bottom tank to the opening to said lower manifold section, a top tank sealingly connected to said top plate so as to cooperate therewith to form a top accumulator chamber open to the opening to said upper manifold section and also to both said accumulator chambers at their top, an outlet pipe in said top tank open to the interior thereof and aligned with the top of the accumulator chamber adjacent said other manifold, and an aspirator tube extending through the last mentioned accumulator chamber having an inlet end located near the bottom of said bottom tank and an outlet end located in said outlet tube.

2. An integral accumulator and evaporator for an air conditioning system comprising a plurality of plates stacked one on another with one plate on top and another plate on the bottom of the stack, said plates having an elongated shape with longitudinally spaced evaporator manifold defining cavities interconnected by an elongated evaporator tube pass defining cavity formed in one face thereof, said plates arranged so that their said cavities cooperate with the corresponding ones in an adjoining and oppositely facing plate so as to define a pair of longitudinally spaced evaporator manifold chambers interconnected by a tube pass between each such pair of oppositely facing plates whereby there is formed a plurality of adjoining evaporator chambers adjacent remote ends of the stacked plates, those plates except for said top and bottom plates and at least one intermediately located plate having an opening connecting the adjoining evaporator chambers at each end so as to define a vertically oriented evaporator manifold with an upper end and a lower end adjacent each end of said stacked plates, said one intermediate plate having an opening connecting the chambers between the two adjoining pairs of said plates adjacent only one of said ends and blocking connection between the corresponding chambers adjacent the other end whereby the manifold adjacent said one end is partitioned into a lower manifold section and an upper manifold section so as to form a flow path from said lower manifold section through the associated tube passes to the other manifold and back through the remaining associated tube passes to said upper manifold section, said top plate having an opening therethrough to said upper manifold section and closing the upper end of the other evaporator manifold, said bottom plate having an opening therethrough to said lower manifold section and closing the other end of said other evaporator manifold, said plates also having accumulator defining cavities in their said face located outboard of said evaporator manifold defining cavities that cooperate with the corresponding ones in the adjoining and oppositely facing plate so as to define a plurality of adjoining accumulator chambers at the remote ends of the stacked plates, said plates having an opening therethrough connecting the adjoining accumulator chambers whereby there is formed a vertically oriented side accumulator chamber with an open top and an open bottom at each said remote end of said stacked plates, a bottom tank sealingly connected to the periphery of said bottom plate so as to cooperate therewith to form a bottom accumulator chamber open to both said side accumulator chambers at their bottom end, an inlet pipe extending through said bottom tank to the opening to said lower manifold section, a top tank sealingly connected to the periphery of said top plate so as to cooperate therewith to form a top accumulator chamber open to the opening to said upper manifold section and also to both said side accumulator chambers at their top, an outlet pipe in said top tank open to the interior thereof and aligned with the top of the side accumulator chamber adjacent said other manifold, and an aspirator tube extending through the last mentioned side accumulator chamber having an inlet end located near the bottom of said bottom tank and an outlet end located in said outlet tube.

* * * * *